Figure 28:
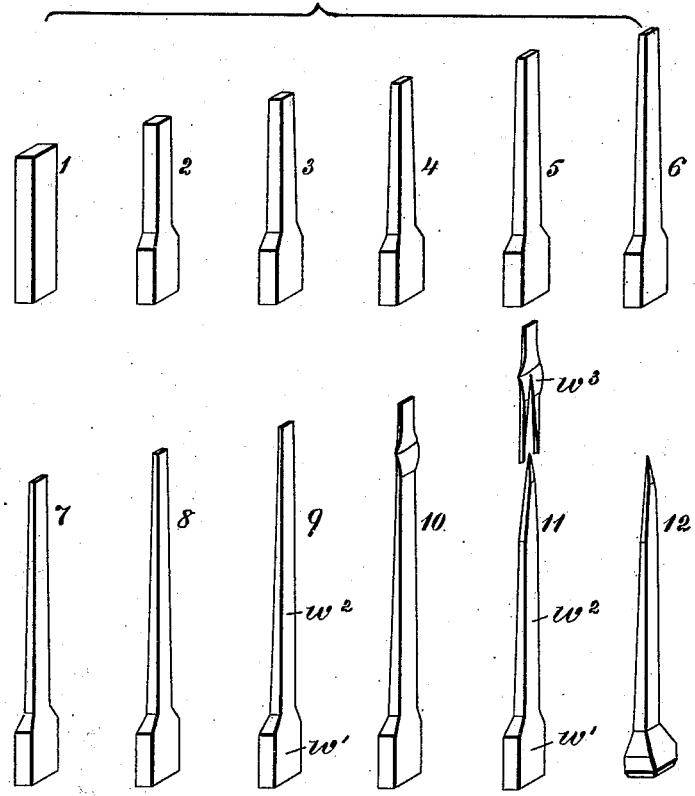

(No Model.)  11 Sheets—Sheet 1.
G. J. CAPEWELL.
HORSESHOE NAIL MACHINE.
No. 351,574. Patented Oct. 26, 1886.
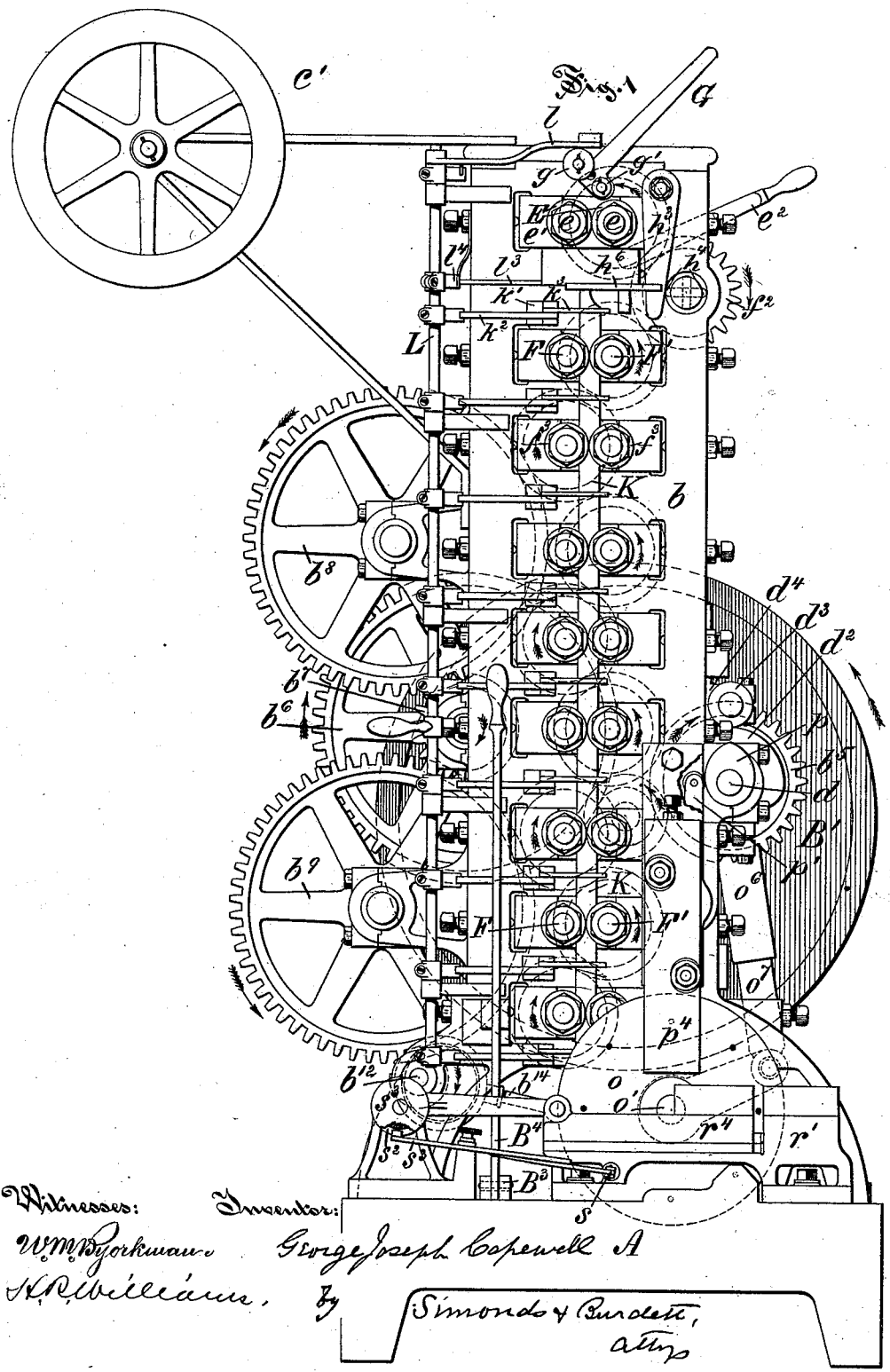

(No Model.) 11 Sheets—Sheet 2.
G. J. CAPEWELL.
HORSESHOE NAIL MACHINE.
No. 351,574. Patented Oct. 26, 1886.
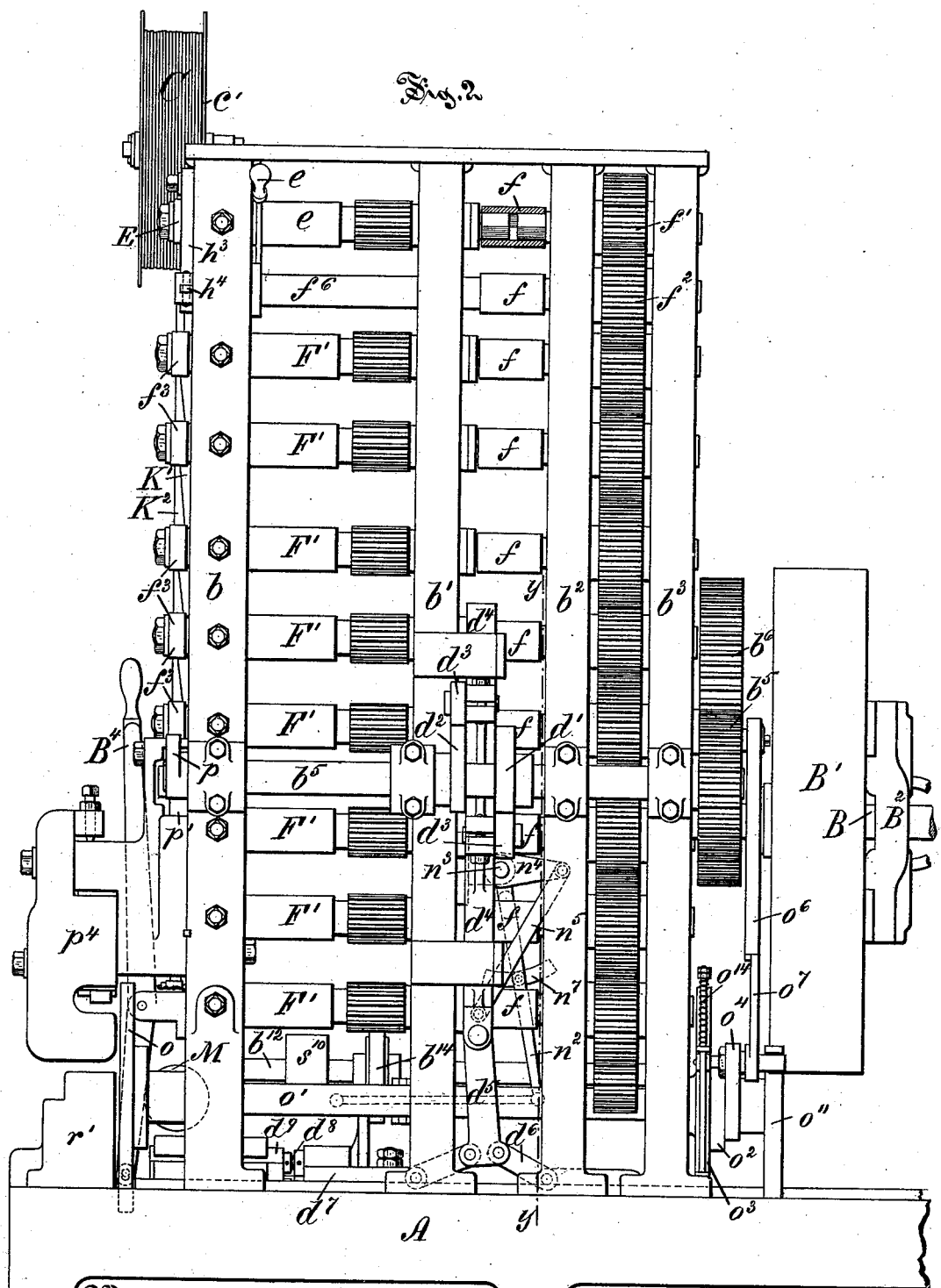

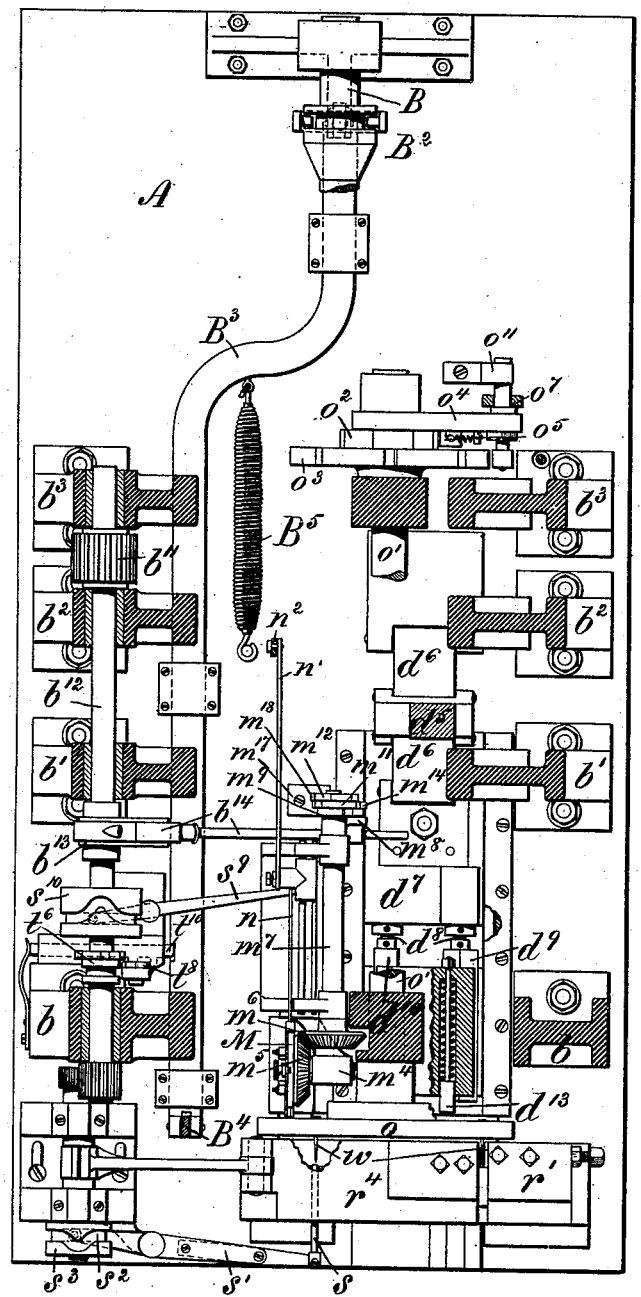

(No Model.) 11 Sheets—Sheet 4.
G. J. CAPEWELL.
HORSESHOE NAIL MACHINE.
No. 351,574. Patented Oct. 26, 1886.
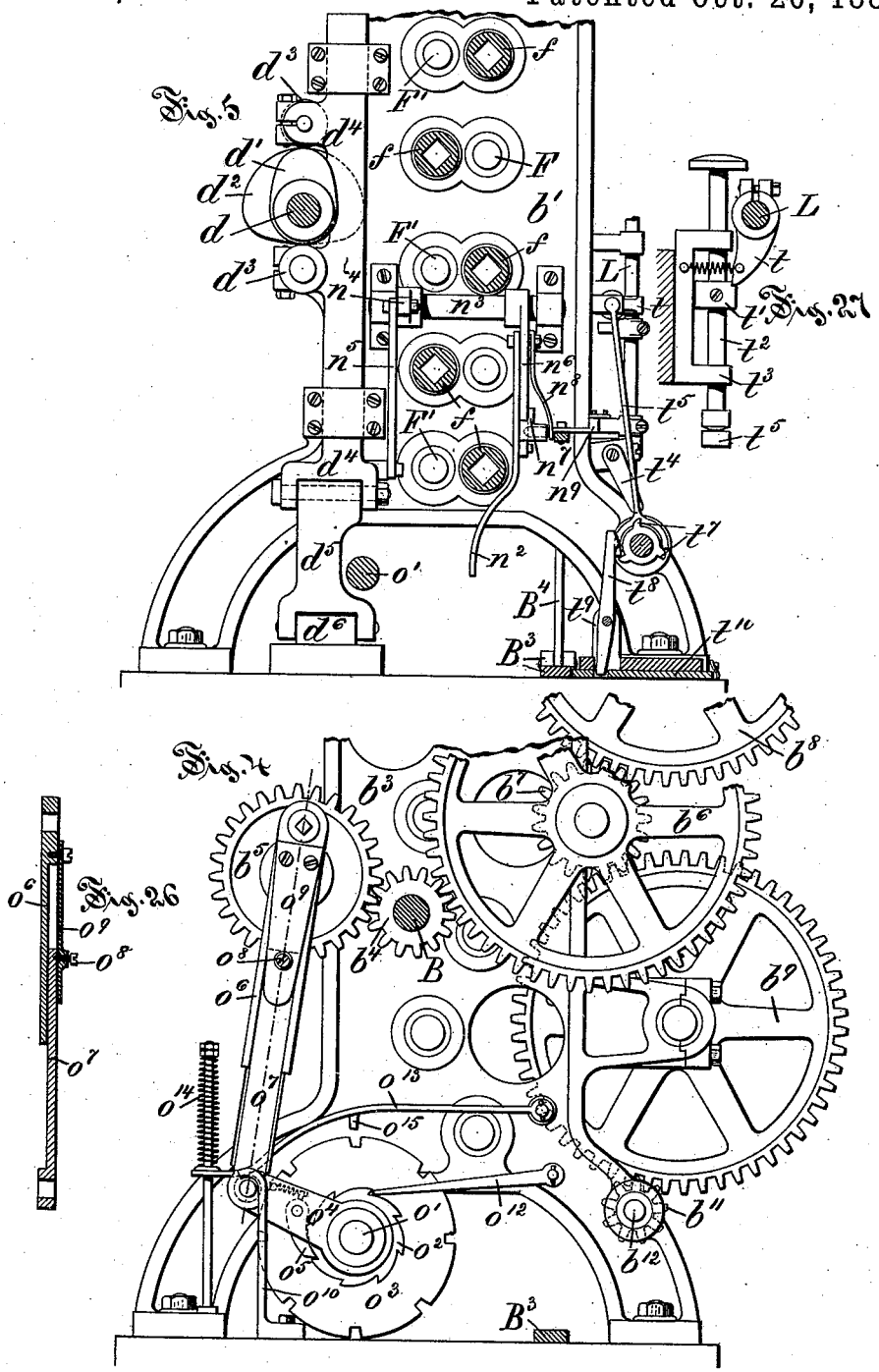
Witnesses:
W. M. Bjorkman
H. R. Williams
Inventor:
George Joseph Capewell
by Simonds & Burdett,
attys

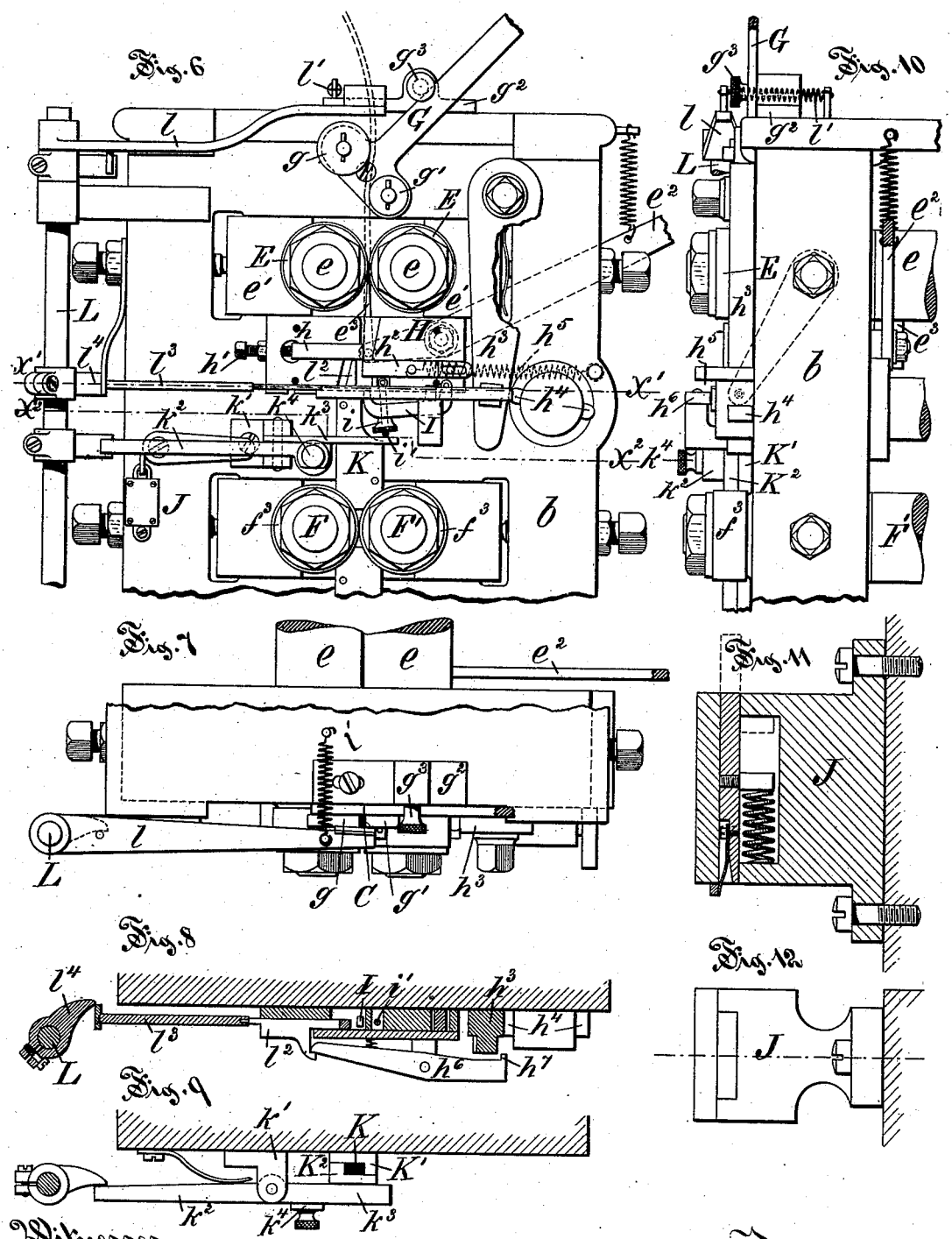

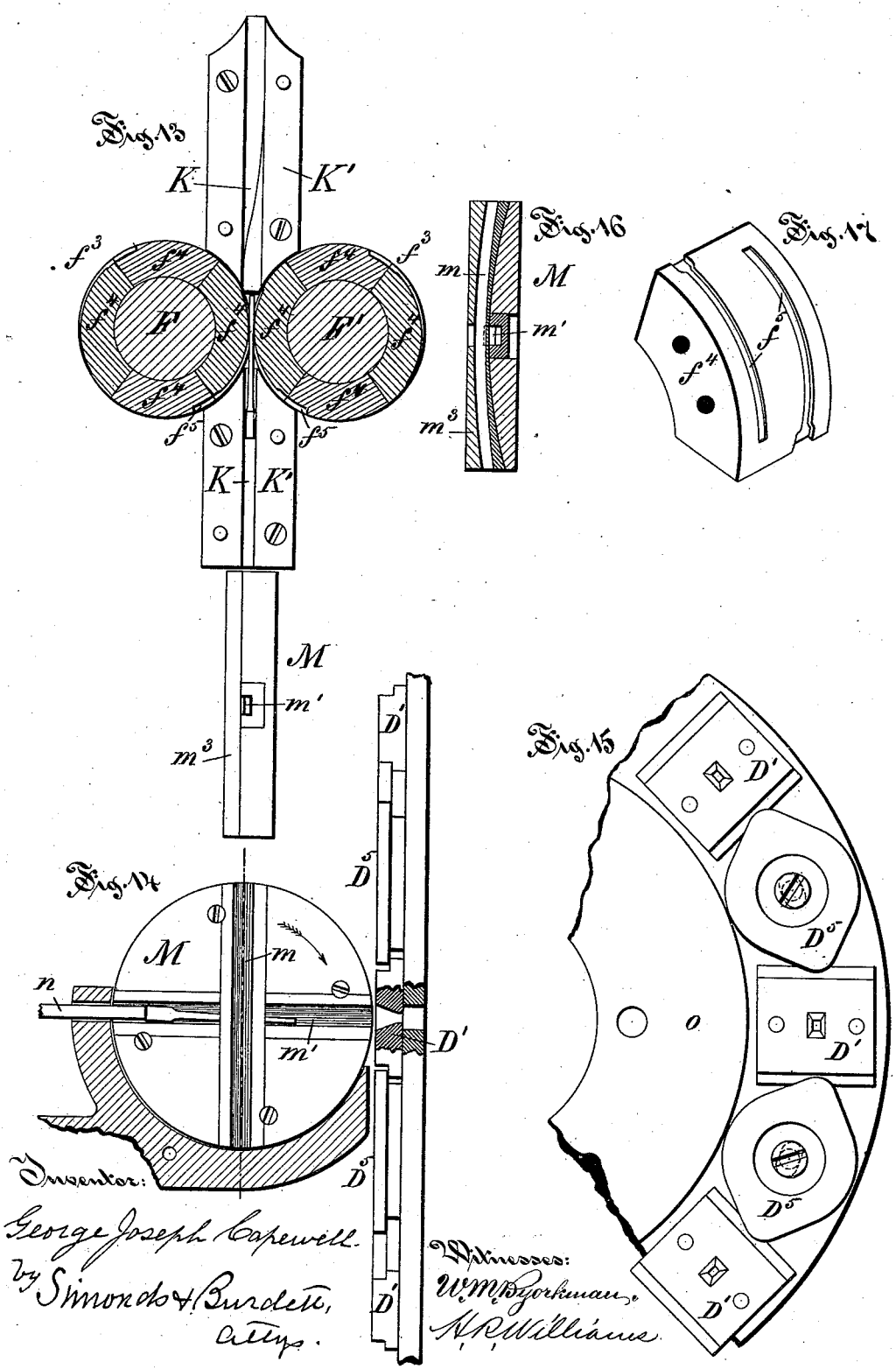

(No Model.) 11 Sheets—Sheet 7.
G. J. CAPEWELL.
HORSESHOE NAIL MACHINE.
No. 351,574. Patented Oct. 26, 1886.
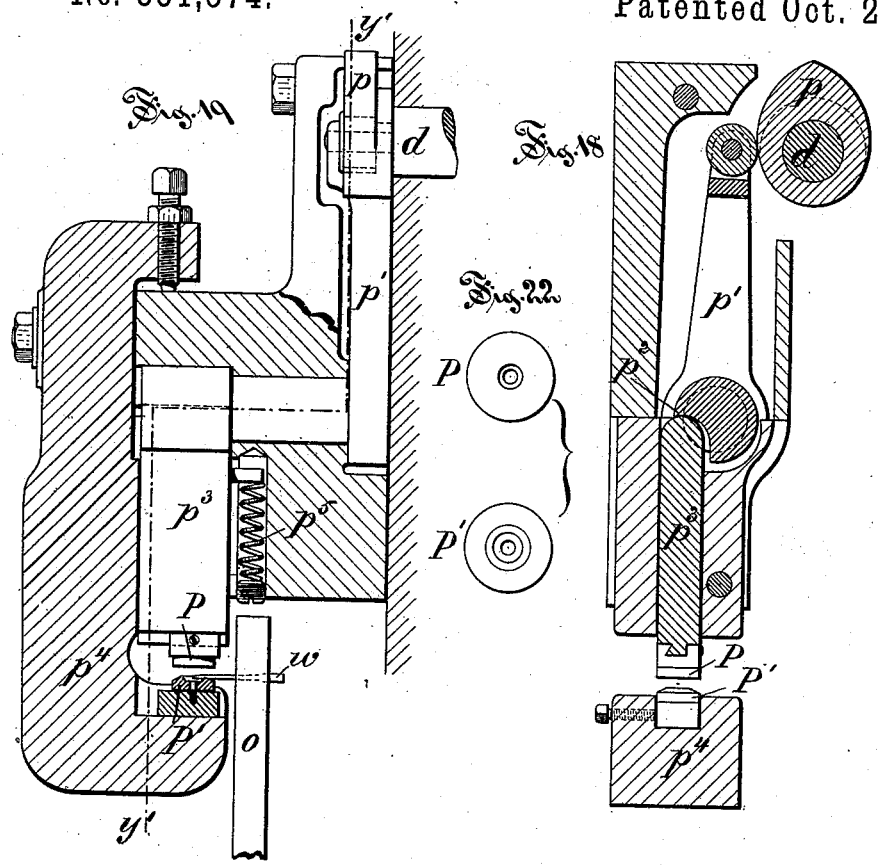
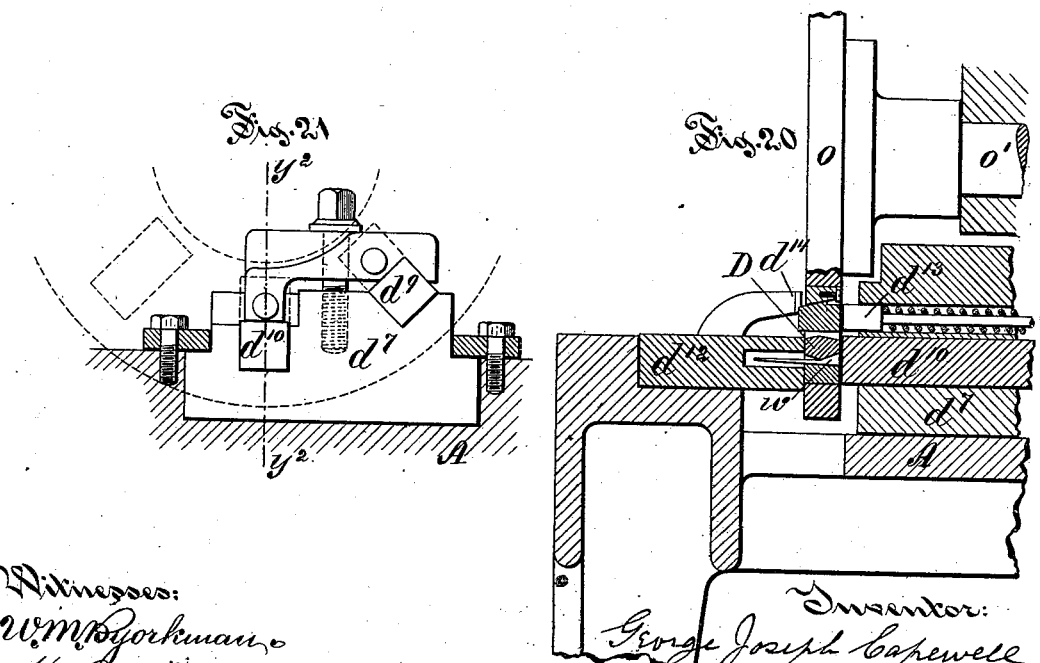
Witnesses:
W. M. Bjorkman
H. R. Williams
Inventor:
George Joseph Capewell
by Simonds & Burdett
Attys.

(No Model.) 11 Sheets—Sheet 8.
G. J. CAPEWELL.
HORSESHOE NAIL MACHINE.
No. 351,574. Patented Oct. 26, 1886.
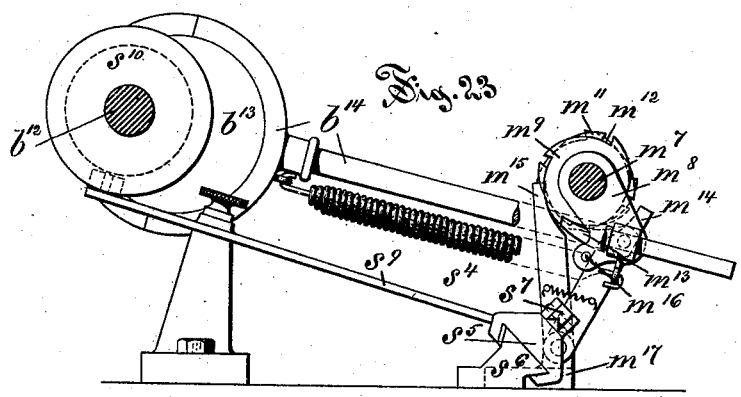
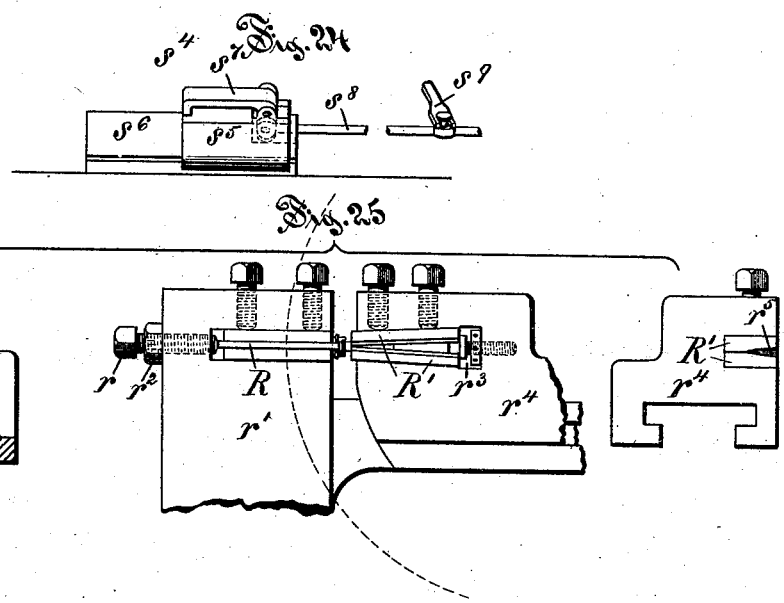
Witnesses:
W. M. Bjorkman,
H. R. Williams.
Inventor:
George Joseph Capewell,
by Simonds & Burdett,
Attys.

(No Model.) 11 Sheets—Sheet 9.
G. J. CAPEWELL.
HORSESHOE NAIL MACHINE.
No. 351,574. Patented Oct. 26, 1886.

Witnesses: Inventor:
W. M. Bjorkman, George Joseph Capewell,
H. R. Williams by Simonds & Burdett,
attys.

(No Model.) 11 Sheets—Sheet 10.
G. J. CAPEWELL.
HORSESHOE NAIL MACHINE.
No. 351,574. Patented Oct. 26, 1886.
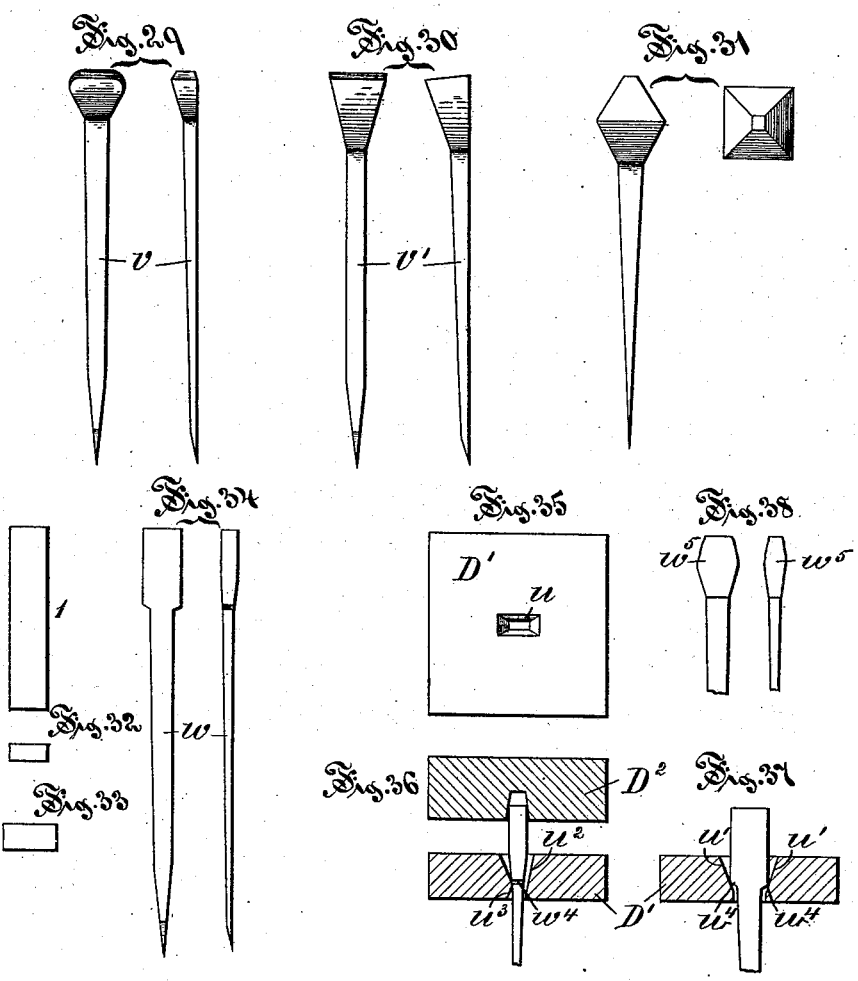

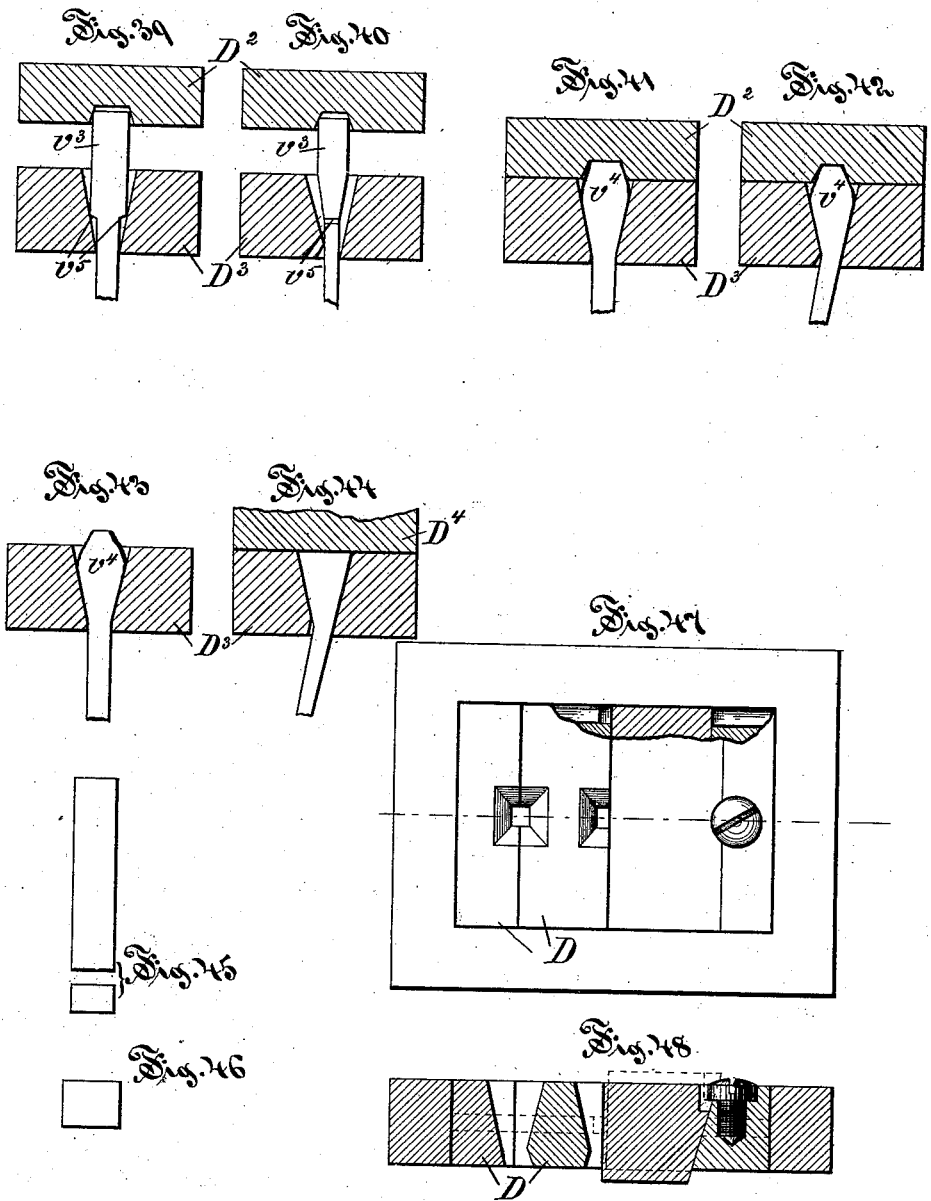

UNITED STATES PATENT OFFICE.

GEORGE JOSEPH CAPEWELL, OF CHESHIRE, CONNECTICUT.

HORSESHOE-NAIL MACHINE.

SPECIFICATION forming part of Letters Patent No. 351,574, dated October 26, 1886.

Application filed July 15, 1886. Serial No. 208,131. (No model.)

*To all whom it may concern:*

Be it known that I, GEORGE JOSEPH CAPEWELL, of the town of Cheshire, county of New Haven, State of Connecticut, United States of America, manufacturer, have invented certain new and useful Improvements in Horseshoe-Nail Machines, of which the following is a full, clear, and exact description, whereby any one skilled in the art can make and use the same.

My improvements relate to the class of nail-machines in which a length of nail-wire is fed cold into the machine, passing between roller-dies, by means of which the short oblong blank cut from the long wire of stock is gradually drawn into shape as to the shank, and then delivered to mechanism in which the several operations of beveling, trimming, and heading the blank are performed to make the finished nail, the several steps in the progress of the blank, from the time of its severance from the rod to the point when it drops from the machine a finished product, are automatic.

Several of the features of my within-described improvements in machines of this class are particularly adapted for use in the machine that is shown and described in United States Letters Patent granted to me January 22, 1884, and numbered 292,201, while several are applicable to different types of nail-making machines, notably those features that relate to the dies.

The object of my invention is to provide a machine in which not only all the types of horseshoe-nails in use in the several countries of Europe and America can be automatically made, but also one in which all the required shapes and sizes of the several types can be equally well produced.

To this end my invention consists in certain improvements in the several parts relating to the feed devices, the cut-off, the stop devices, the roller-dies, the several beveling, trimming, and heading dies, and in the mechanisms relating thereto, as more particularly hereinafter described, and pointed out in the claims.

Referring to the drawings, Figure 1 is a view in front elevation of my improved horseshoe-nail machine, some of the smaller parts being omitted in this view for the sake of clearness. Fig. 2 is a view in side elevation of the machine, in which smaller parts are also omitted. Fig. 3 is a plan view of the bed of the machine, the several standards and other parts being cut away to show construction. Fig. 4 is a detail view in rear elevation of part of the machine, showing the connection of the driving gear and shafts, and also part of the step-by-step device of the heading-plate shaft. Fig. 5 is a detail view in vertical section of the lower part of the machine on plane denoted by line $y\ y$ of Fig. 2. Fig. 6 is a detail front view, on enlarged scale, of the upper part of the machine, showing details of the feed device, cut-off, gage, and several of the stop devices. Fig. 7 is a detail top view of this front part of the machine. Fig. 8 is a detail view in horizontal section on plane $x'\ x'$ of Fig. 6. Fig. 9 is a detail view in horizontal section on plane denoted by line $x^2\ x^2$ of Fig. 6. Fig. 10 is a detail side view of the upper part of the front frame of the machine, looking from the right. Fig. 11 is a detail view in vertical section of the indicator. Fig. 12 is a detail top view of the indicator-box. Fig. 13 is a detail view, on enlarged scale, of the lower part of the guide-way, in vertical section of two of the roller-dies, and in edge view of the quarter-turn plate. Fig. 14 is a detail face view of the quarter-turn plate with the cover removed, and in edge view of the heading-plate. Fig. 15 is a detail plan view of part of a heading-plate, showing several of the dies in place and the means of holding them in the plate. Fig. 16 is a view in vertical central cross-section of the quarter-turn plate. Fig. 17 is a detail view, on enlarged scale, of one of the removable shank-forming dies. Fig. 18 is a detail view, on enlarged scale in vertical section, of the beveling-cam, the lever, the plunger, and, in side view, of the beveling-dies on plane $y'\ y'$ of Fig. 19. Fig. 19 is a detail view, on enlarged scale, showing the beveling dies and connected plunger, levers, and cam. Fig. 20 is a detail view, on enlarged scale, of parts of the heading-die, heading-plate, and butt-piece on plane $y^2\ y^2$ of Fig. 21. Fig. 21 is a detail front view of the parts shown in Fig. 20. Fig. 22 shows a detail face view of the upper and lower trimming-dies. Fig. 23 is a detail view, in side elevation, of part of the mechanism for operating the quarter-turn pipe and pull-out. Fig. 24 is a detail side view of part of the pull-out device. Fig. 25 shows detail views of the trimming device.

Fig. 26 is a detail view in section of the pitman-slide. Fig. 27 is a detail view, in horizontal section, of the knock-off of the stop device. Fig. 28 is a detail view of the series of blanks in progress from the original oblong blank to the finished nail. Fig. 29 shows in front and edge view one type of horseshoe-nail. Fig. 30 shows in front and edge view another type of horseshoe-nail. Fig. 31 shows in side and top view another type of horseshoe-nail. Fig. 32 shows a blank, in side and in end view, of the size adapted to make the nail shown in Fig. 29. Fig. 33 is a detail plan view of the top and head of the latter nail. Fig. 34 shows in detail, in front and in edge view, a nail-blank on which the shank has been formed. Fig. 35 is a detail front view of one of the heading-dies. Fig. 36 is a detail view in vertical section through the heading-dies, the upper one of which has a cup-shaped recess. Fig. 37 is a detail view in cross-section of the die shown in Fig. 35, lengthwise of the head-socket. Fig. 38 shows in detail, in front and in edge view, a blank after the head has been partly formed by the use of the cupped heading-die. Fig. 39 is a view in central cross-section through the heading-die, adapted to form the type of nail shown in Fig. 30. Fig. 40 is a detail view, in central section through these heading-dies on a plane at right angles to that of the view shown in Fig. 39. Fig. 41 is a view in central section of the heading-dies closed upon the blanks. Fig. 42 is a view in central section of the heading-dies closed upon a blank and in a plane at right angles to the view shown in Fig. 41. Fig. 43 is a detail view in section of the lower heading-die, in which the nail-head is finished. Fig. 44 is a detail view in section of the heading-dies, illustrating one feature of my invention. Fig. 45 shows in detail, in plan and end view, a blank from which the nail shown in Fig. 30 is adapted to be made. Fig. 46 shows in plan view the top of the head of the finished nail. Fig. 47 is a plan view of part of the head-plate, showing sectional dies. Fig. 48 is a detail view in cross-section of these dies on plane $z\,z$ of Fig. 47.

In the accompanying drawings, in which one form of my machine is shown, the letter A denotes the bed or base of the machine.

$b\ b'\ b^2\ b^3$ denote several upright frames that are fast to or a part of the bed, and in which most of the shafts and journals of the several rotary parts of the mechanism have their bearing.

The end of a rod of stock, C, is fed from a reel, $c'$, through the guide-rolls $g\ g'$ and between feed-rolls E, below which an oblong blank is cut from the end of the rod, and this blank then passes between roller-dies borne in a series of shafts, F F', arranged in pairs at intervals in bearing-blocks supported in the frames. The function of the roller-dies is to form the blank into a shank-section and a head-section, and from the last pair of dies of the series the blank is passed into the control of mechanism by means of which the several operations of beveling the point and trimming it and swaging and forming the head are performed.

In the rear of the machine, on the main shaft B, is supported a driving-pulley, B', that turns freely on the shaft, except when engaged by the clutch device $B^2$, a part of which only is shown in the drawings, Fig. 3.

The clutch device is operated by means of any convenient or ordinary form of shipping-lever, and a detailed description of this device is not needed in order to understand its operation.

On the main shaft B, and near the back of the frame $b^3$, (see Fig. 4,) there is fast a small gear-wheel, $b^4$. This smaller gear meshes into and drives the shaft and gear-wheel $b^5$, fast to the heading-cam shaft, and also a large gear-wheel, $b^6$, on the shaft of which is fast a pinion or small gear, $b^7$, from which the two larger gears, $b^8$ and $b^9$, are also driven. One of each of the pairs of roller-die shafts extends between the frames $b$ and $b'$, while the other one of the pair extends beyond the frame $b'$, and is, by means of a coupling, $f$, (see Fig. 2,) united to a short driving-shaft bearing one of a train of gears. Of these several gears, the upper one, $f'$, is fast to the feed-roll shaft. The next, $f^2$, is fast to the cut-off shaft. The next, five gears below that, are fast to the several roller-die shafts, all of which are driven from the larger gear-wheel, $b^8$, and they are arranged in alternation upon opposite shafts of each pair, so that the roller-die shafts that are united by smaller gears are driven toward each other in each pair. The overlying arrows in Fig. 1 show the direction of motion of the several gears. The rest of the series of roller-dies are driven by similar small gears in mesh with each other and driven from the cog-wheel $b^9$. This latter cog-wheel is also in mesh with a small gear on the shaft from which the quarter-circle pipe and other mechanisms are operated.

A wire-straightening lever, G, (see Fig. 6,) is pivotally connected to the top of the frame $b$, so as to move in the plane of the front of the frame, and it bears upon each side of the pivot the rollers $g\ g'$, between which the wire is passed as it is fed into the machine from a reel or like source of supply. On top of the frame is secured an adjustable block, $g^2$, bearing a stop, $g^3$, by means of which the angular position of the wire-straightening lever is determined. This stop $g^3$ may be removed to allow the lever to be swung into a vertical position, and is replaced to hold it in such angular position that the rolls $g$ and $g'$, taken in connection with the two feed-rolls directly below them, may be used to straighten the wire as it is fed into the machine. The feed-rolls E are borne on the projecting ends of the feed-roll shafts $e$, and they are supported in spring-seated bearing-blocks $e'$, that enable these rolls to yield and spread apart, so that their adjacent faces conform to the slightly-varying thickness of a nail wire or stock. They may be held permanently apart, however, by means of the wedge-lever $e^2$, that is pivotally connected to the frame and to a wedge, $e^3$, the point of which projects between the rolls from beneath, as illustrated in Fig. 6 of the drawings. After the end of the wire is passed between the feed-rolls, it is intercepted in its downward progress by meeting the end of the gage I, that is pivoted to the frame, and is adjustable in the direction of the movement of the wire by means of the feed-screw $i$, borne on a threaded rod, $i'$, that is attached to the frame at one end opposite the feed-screw, and passes through the body of the gage. The position of this gage determines the exact length of the blank that is sheared from the rod by means of the cut-off device H. This cut-off device consists of a dead cutter, $h$, seated in the block fast to the frame and adjustable, by means of the feed-screw $h'$, toward and from the path of the nail-stock as it feeds into the machine, and of a live cutter, $h^2$, that has a sliding motion in a way formed in a block fast to the frame. This live cutter $h^2$ is thrust forward by means of the cut-off lever $h^3$, under the impulse of the wiper $h^4$, consisting of cam-lugs projecting from the rotary cut-off shaft $f^6$, and it is held outward by means of the spring $h^5$, one end of which is attached to the cutter and the other to the frame $b$. By the forward movement of this cutter a certain length of stock is sheared off and is dropped directly into the upper end of the guideway K, along which it passes between the first pair of roller-dies, by means of which it is reduced to the shape shown at 2 in Fig. 28. When the end of the length of wire or stock passes below the inner end of the feeler-arm $l$, the outer end of which is fast to the rotary stop-rod L, the spring $l'$ (see Fig. 7) pulls this arm sidewise, rotates the rod, and serves to stop the machine by means of a device hereinafter described. In case the oblong blank cut from the end of the nail-rod by the cut-off device becomes clogged, so that it does not drop into the guideway, it is pushed against the end of the slide-block $l^2$, (see Fig. 8,) which in turn pushes the rod $l^3$ against the end of a stop-finger, $l^4$, that is fast to the rod L, in such manner as to rotate this rod and thus stop the machine. This movement of the block $l^2$ unhooks one end of the tilting cut-off lever-latch $h^6$, and allows the opposite and hooked end $h^7$ of this latch to engage the lever $h^3$, and hold it forward out of contact with the wiper, and thus completely stops the movement of the cutters. The use of this stop device, in combination with the tools for cutting the blanks successively from a continuous rod of stock, is a distinctly new and an important feature of improvement in this regard over my prior machine.

Still another stop device is employed in case a blank becomes clogged in the guideway K. This guideway is formed in a sectional block. One of the parts, K', of this block is fast to the face of the frame, and the other, K², is attached to the fixed part by means of dowels taking into holes in the former part, and it is held in its proper place by the pressure of the spring-actuated stop-lever $k$. This stop-lever is made in two parts, both pivoted to the stand $k'$ by a common pivot, in a position to move in a plane at substantially right angles to the direction of the guideway, the longer part, $k^2$, overlapping the other, $k^3$, and bearing a turn-button, $k^4$, or like device, the overhanging edge of which may be made to engage the outer edge of the lever part $k^3$, so that when the block-section K is thrust outward by the clogging of a blank in the way the whole lever will be turned so as to thrust the outer end of the lever inward and push against the stop-finger on the stop-rod L, so as to turn the latter and stop the machine. The outer section, K², of the guideway-block is held in place by the stop-lever under the pressure of the spring $k^5$ upon the outer end of this lever.

In order to show in what part of the guideway the difficulty or clogging is located, an indicator, J, is secured to the face of the frame in such position that the movement (see Fig. 6) of this stop-lever by the outward push of the section K² trips a slide, $j$, that is thrust out of the box by the impulse of the spring $j'$, and thus locates the difficulty. After removing the cause of the stopping, the parts are replaced, the indicator set, and the machine again started.

*The guideway.*—The guideway K is a tubular channel formed in the substance of the blocks K' K², or in any other convenient way, and it is so twisted lengthwise between each pair of roller-dies that the blank, which is subjected to edgewise pressure in one of the pair of dies, turns in its passage to the next pair, so that it is grasped and pressed flatwise or on sides at an angle with the edges of the blank, the result of this operation of the dies alternately upon opposite sides of the oblong blank being to shape it in succession into the several forms shown from 2 to 9 in Fig. 25, so that it leaves the last pair of dies formed as to the head-section $w'$ and shank-section $w^2$. This twisted guideway is substantially the same as the one used by me in my machine for reducing metal, shown and described in my United States Letters Patent of October 23, 1877, No. 196,334. The sectional blocks and stop device are, however, new in the present machine.

The dies $f^3$ are made in segmental sections, and are removably secured to the die-shafts, as by means of dowel-pins and screws, each die-section $f^4$, however, having a plural number of die-grooves $f^5$ for shaping the blanks. These die-grooves are formed on opposite sides of the face of the die-section, (Fig. 17,) so that when one groove has become worn the unworn groove may be brought into use by reversing the die-section, and this may be done with but slight loss of time.

As soon as the nail-blank in its progress along the way has passed the last pair of shank-forming dies, it passes directly into the quarter-turn plate M, the function of which is to change the direction of motion of the blank that up to this time has passed from pair to pair of dies by the action of gravity. This quarter-turn plate M is so made as to provide a plural number of independent crosswise tracks or channels, $m$ $m'$, along which a blank can move without the least obstruction from end to end. In the form shown in the drawings, (see Figs. 13, 14, 16,) a plate or disk is used for this purpose having a removable cover, $m^2$, shown as removed in Fig. 14, to illustrate the operation of the plate and drive-in and show the independent channels.

By the term "independent," as thus used in the within description and claims in characterizing the channels in the quarter-turn plate, I intend to bring out the fact that each channel or covered track is complete in itself and has a clear way with unbroken walls from end to end, although several channels may cross the same center of rotation of the plate or its equivalent part. In my said prior machine of this class the channels opened into each other—in fact, they radiated from a common central space—and thus required that a nail-blank should be pushed completely out of one channel before the next blank could be dropped into the other channel, and there was danger of clogging the blank in its movement along the channel by reason of the breaks in the walls. By means of my improvement the chance of such clogging is avoided, and greater speed in the feeding of the blanks into and out of the several channels in the plate is insured.

The plate or its equivalent—a number of pipes—is mounted on a short shaft supported in the stand $m^4$, Fig. 3, and bearing a bevel-gear, $m^5$, meshing with a like bevel-gear, $m^6$, on shaft $m^7$ of the quarter-turn mechanism. This large gear-wheel $b^9$, already described, meshes into a pinion or small gear, $b^{11}$, on the shaft $b^{12}$, Figs. 3 and 4, and an eccentric, $b^{13}$, on the latter is connected by a strap and rod, $b^{14}$, with the crank $m^8$, that is mounted on the shaft $m^7$, so as to allow the crank to swing freely or vibrate on the shaft.

On the shaft $m^7$, and next to the hub of the crank, are located three ratchet-wheels, $m^9$ $m^{11}$ $m^{12}$, that are secured to the shaft, and a spring-pawl, $m^{13}$, borne on the crank $m^8$, engages the teeth of the ratchet-wheel $m^9$, to change the vibrating movement of the crank into the intermittent step-by-step rotation of the shaft $m^7$, that turns with it the quarter-turn plate. It is important that the movement of this plate should be positive, and that when it stops after each partial rotation there should be no lost or return motion of the plate, as the inlet end of each channel must correctly register with the bottom of the guideway in one of its positions, and in its next position must correctly register with the nail-socket of the heading-die, into which the blank is thrust by the drive-in rod $n$. To give this positive motion to the quarter-turn plate there are detent-levers $m^{14}$ $m^{15}$, pivoted at one end to the stand $m^{17}$, and with the free end of each adapted to make contact with the teeth of the ratchet-wheels $m^{11}$ $m^{12}$, respectively. A pin projecting from the side of the crank $m^8$ in the forward movement of the crank pushes the detent-lever $m^{14}$ out of engagement with a tooth on the ratchet-wheel $m^{11}$, thus allowing the shaft to turn by contact of the spring-pawl $m^{13}$ with a tooth of the ratchet-wheel $m^9$. This rotation of the shaft continues until the end of this detent-lever $m^{14}$ engages the next tooth of the ratchet-wheel $m^{11}$ and stops it. At the same time the other end of the detent-lever $m^{15}$ slips into engagement with a tooth in the ratchet $m^{12}$, and prevents rotation of the shaft in the opposite direction.

The function of the drive-in mechanism is to force the blank out of the quarter-turn plate into the heading-die, and a reciprocating movement is given to the drive-in rod $n$ by the link $n'$, connected to the lower end of the drive-in lever $n^2$, the upper end of which is attached to a crank-shaft, $n^3$, (see Figs. 2 and 5,) that is supported in bearings crosswise of the frame $b'$. On the other end of this shaft $n^3$ is secured a crank-arm, $n^4$, connected by a rod, $n^5$, with the pitman-slide of the header-die-operating mechanism. By means of this device the vertical movement of the pitman is translated into a horizontal reciprocation of the drive-in rod.

In order to prevent the breaking of the parts by the clogging of a nail-blank in the quarter-turn plate, the drive-in lever $n^2$ is made in sections, the upper one, $n^6$, being fast to the crank-shaft and bearing on its lower end a curved arm or quadrant, $n^7$, while the lower section of the drive-in lever is pivoted to this upper section and is held in engagement with it by means of a spring-pin seated in a socket in the upper section and having a conical end taking into a recess in the lower section of the drive-in lever. If this drive-in lever meets with resistance in its reciprocating motion, the effect will be to separate these sections of the lever, and under the impulse of the spring $n^8$ turn the bell-crank lever $n^9$, that is supported on a lug on the frame $b'$, in such manner as to operate to turn the stop-rod L, with a stop-finger on which this bell-crank lever is connected. (See Fig. 5.)

The heading-dies D, into which the nail-blank is driven from the quarter-turn plate, are held in the heading-plate $o$, that is fast to and turns with the heading-plate shaft $o'$, the rotary motion of which is an intermittent step-by-step motion, exactly timed with the motions of the quarter-turn plate, and this step-by-step motion is given by the following device, that is clearly shown in Figs. 1, 2, 3, and 4.

At a convenient point—in this instance at the end of the shaft $o'$, near the back of the machine—there is secured a ratchet-wheel, $o^2$, and a detent-wheel, $o^3$, while the crank-arm $o^4$ is formed to turn loosely on the shaft. A spring-pawl, $o^5$, is pivotally connected to one side of the crank-arm with its end adapted to engage the teeth of the ratchet-wheel $o^2$, and a vibratory movement of this crank is imparted to it by means of a pitman, $o^6$, that is driven from a crank-pin fast to the side of the gear-wheel $b^5$. This pitman is composed of two parts that slide lengthwise upon each other, and the outer part, $o^7$, is held in its extended position by means of the pin $o^8$, fast in the spring $o^9$, by means of which the conical point of the pin is caused to engage a socket in the side of the part $o^7$. In case there is any obstruction to the rotary movement of the heading-plate shaft this pitman yields lengthwise when a certain degree of pressure is reached and prevents the breaking of the parts. The hooked upper end of the arm $o^{10}$, that is fast to the bed-plate, limits the upward movement of the crank-arm $o^4$, and after the pitman has been closed together, as described, it is again extended to the proper length by the pull of the crank upon one end of the pitman and of this hooked arm $o^{10}$ at the other end.

In order to hold the heading-plate in proper position at the end of each of its partial rotations, the detent-levers $o^{12}$ $o^{13}$ are employed. The operation of this lever $o^{12}$ is clearly seen in Fig. 4 of the drawings, and the lever $o^{13}$ is lifted by a pin on the crank-arm and depressed by the spring $o^{14}$ at proper times, the lug or tooth $o^{15}$ on the under side of the lever dropping into a recess in the edge of the detent-wheel and aiding in holding the heading-plate shaft and the plate firm against rotation in either direction until the proper time for the next movement.

After the nail-blank has been driven into the heading-die it is carried with the heading-plate in its step-by-step rotation, and in one of the pauses of this plate it is held with the point end of the shank between the beveling-dies P P', by the operation of which the bevel shown at 10 in Fig. 28 is produced in the nail-shank. On the front end of the heading-cam shaft $d$ there is secured the beveling-cam $p$, (see Figs. 1, 2, 18, 19,) that in its rotation wipes against a roller journaled in the end of a tilting-lever, $p'$, a short arm or knuckle, $p^2$, on which pushes the plunger $p^3$, that bears on its outer end the flat die P with great force upon the nail-shank while it is held on the die P' that is secured to the bed $p^4$. The plunger $p^3$ is lifted off the work and held in contact with the knuckle $p^2$ by the spring $p^5$, that is seated in a socket in the frame $b$ or in a block fast to it. The beveling-die P is a round disk with a flat face, while the other die, P', is formed preferably on the end of a cylinder, and has a beveled edge and a countersunk center, the angular position of the surfaces of the die being such that the proper degree of bevel is given to a nail laid radially upon it. The advantage of this form of die is that when it has become worn and uneven at any part, by simply rotating it on the central screw that fastens it to the bed a new surface is brought into play, and this makes a cheap and durable device. The flat die is rotary in like manner to renew the working-face. At another pause in this intermittent movement of the heading-plate the nail is presented to the action of trimming-dies R R', that by shearing off a scrap, $w^3$, leave a point on the nail, as shown at 11 in Fig. 28. One of the trimmer-dies, R, is a wedge-shaped punch clamped between jaws or cheek-pieces in a recess in the trimmer-base $r'$ by means of screw-bolts, and presenting one end to the back of the point end of the nail-blank, while the other end is supported on the end of a screw-bolt, $r$, that is held in a fixed position by means of a set-nut, $r^2$. The other trimmer-die, R', is made up of two blades clamped in a socket, $r^3$, in the trimmer-slide $r^4$, and held apart at the back ends by a wedge solid with the slide, while the front ends meet at a point a short distance in front of the face of the slide, the wedge-shaped lateral opening $r^5$, between and lengthwise of the blades, presenting at the end of this die an opening exactly conforming to the end of the punch that enters this opening at each reciprocation of the slide, the scrap $w^3$ being sheared or trimmed from the nail-blank by its operation.

There is fast to the trimmer-base $r'$ a reciprocating clearer, $r^6$, that is borne on a spring-seated spindle in a socket in the base, and has a <-shaped or forked point, the tines of which extend over and are adapted to slide lengthwise of the die R. The normal position of the clearer is of course in a plane slightly in advance of the end of this die, and the front end of the trimmer-slide in its movement strikes the end of the clearer, pushes it back along the die R', and at the same time it cuts off the scrap $w^3$ from the nail-blank and pushes it onto the die R. On the return movement of the slide the clearer follows it out under the impulse of the spring and pushes the scrap off from the die and causes it to fall clear of the mechanism through an opening below the dies.

The next and final operation to which the nail-blank is subjected in the machine is the swaging of the head, and this is done by means of the heading-dies D. One part of each of these dies is formed in or preferably attached to the heading-plate, while the other part is borne on a reciprocating plunger operated by the heading-slide that is attached to the bed of the machine. The heading cam-shaft $d$ bears a heading-cam, $d'$, and also a follower-cam, $d^2$, these two cams (see Figs. 2 and 5) being in close rolling-contact with the cam-rolls $d^3$, that are journaled in projections from the pitman-slide $d^4$, that has a vertical reciprocation in guides secured to the frame $b'$. (See Figs. 2 and 5.) The lower end of the pitman-slide $d^4$ is pivotally connected to the link $d^5$, the other end of which is connected to the toggles $d^6$. One of the latter is pivoted to and thrusts against the solid body of the bed, while the other end is pivoted to and thrusts against the heading-slide $d^7$, that moves in ways fast to or formed in the bed A of the machine. This slide bears, projecting through its face, a number—in this case two—of stout bolts, $d^8$, the front ends of which may be adjusted with reference to the face of the slide and held in place by means of set-nuts. In the forward movement of the slide its front end or the ends of these bolts $d^8$ strike the rear end of the plunger $d^9$ $d^{10}$, respectively, and drive them forward toward the heading-plate. The front ends of these plungers either form or bear the complementary part of the heading-dies. In some instances, as shown in Fig. 20, the front end of the plunger $d^{10}$ strikes upon the end of the nail $w$, that is held in the heading-die plate and swages it to shape, while in other instances, in connection with nails of peculiar form, that will be hereinafter described, the end of the plunger bears a cupped or recessed die. The heading-plate or the die which is held in it is backed up and supported under the blow of the plunger by the butt-piece $d^{12}$. After the head has been formed on the nail it is pushed out from the plate at the next pause by means of the push-out $s$. This push-out (see Figs. 1 and 3) is a sliding rod or punch moving in a socket in the trimmer-piece in the line of the axis of the nail, that in one of the pauses of the plate stops directly opposite the inner end of the rod. The outer end of this rod is pivoted to one end of the push-out lever $s'$, whose other end bears a pin projecting into a cam-slot, $s^2$, in the face of the cam $s^3$, that is fast to and rotates with the trimmer-slide shaft. As soon as the nail is clear of the heading-plate, it drops through an opening in the bed of the machine into any suitable receptacle. As an aid, however, in removing the nail from the heading-plate, the pull-out $s^4$ (see Figs. 23 and 24) may be used, and this consists of the slide $s^5$, dovetailed to a stand, $s^6$, and bearing a hooked bent lever, $s^7$, the front end of which is adapted to embrace the head of the nail, and is held firmly upon it, in the return movement of a slide, by the pull of the rod $s^8$ through the medium of the lever $s^9$, that is driven by the cam $s^{10}$, fast to the shaft $b^{12}$.

Several of the devices for rotating the stop-rod L have been already explained, and the effect of such partial rotation of the rod is to stop the machine. When the rod L turns in one direction, the knock-off $t$, Figs. 5, 27, is lifted out of contact with the adjustable block $t'$ on the knock-off rod $t^2$, that at once yields and moves endwise in the bracket $t^3$ under the impulse of the spring $t^4$, that pushes the upper end of the swinging knock-off lever $t^5$ against the end of the rod. The lower end of this lever is forked and engages a groove in a sliding block, $t^6$, that is splined onto and turns with the shaft $b^{12}$. This block bears a number of cams or lugs, $t^7$, that are by this movement of the block brought into contact with the upper end of the lever $t^8$, that is pivoted to the stand $t^9$ on the bed, with its lower end engaging a bolt, $t^{10}$, that is by this movement of the lever $t^8$ drawn back, so as to release the clutch-rod $B^3$, into a socket in the side of which the end of the bolt is adapted to catch when the rod is at one end of its sliding play. This clutch-rod $B^3$ moves in guides on the bed of the machine, and is pivoted at one end to the shipping-lever, by means of which the clutch is operated, and at the other end to the handle-lever $B^4$, at the front of the machine. The upper end of this lever is conveniently located for starting the machine from the front end, after the spring $B^5$ has pulled the clutch-rod back to stop the machine.

An important feature of my improvement that may be embodied in this machine is the processes that enable me to produce nails with heads of any desirable size from nail-stock of comparatively small area of cross-section. One feature and particular point of improvement in this regard consists in forming the nail-shank on a blank of suitable size, then swelling the head-section of the blank laterally in dies, and then completing the forming of the head by successive blows or pressure in dies of the required shape. A further feature of improvement relates to the method of preventing the jamming of a blank in the heading-die, that in one form consists in forming an abrupt shoulder on the blank where the shank terminates and making the heading-socket in the die with walls of less slope than the shoulder is. These latter features form the subject-matter of my application of Serial No. 207,255.

In the accompanying drawings, the letter $w$ denotes a nail-blank, which is an oblong piece of metal cut, usually, from the long rod or wire of stock that is rectangular in cross-section. This blank is of suitable size from which to make the nail illustrated in Fig. 29 of the drawings, and in the practice of my invention the shank $w^2$ is first formed from the blank by means of dies that operate on the blank without preliminary heating. This shank may, however, be formed in any desirable and ordinary manner, the head-section $w'$ of the blank being left substantially of the dimensions illustrated in Fig. 34. Looking at the nail-blank edgewise, the taper is gradual on the opposite sides from the head-section into the shank-section, while on the edges of the blank are formed the abrupt shoulders $w^4$, where the head-section merges into the shank-section of the nail-blank.

In the operations or steps in forming the head to which the blank is subjected from this stage to the final stage, I make use first of the heading-dies. The heading-die D' has a socket, $u$, tapering from its broader openings in the upper face of the die to the narrower portion on the reversed side of the die. This socket has on the two sides $u'$ a substantially straight taper from the upper to the lower surface of the die, although both sides are relieved slightly near the bottom of the die, while on one of the remaining sides the lower portion, $u^3$, is cut away at an angle with the upper part of the sloping surface on a plane more nearly conforming to the slope of the opposite side, $u^2$, which is an even slope from top to bottom.

In compressing the oblong head-section of the blank to the requisite final shape of the head, there is danger of crippling this section in the first blow struck upon it by the heading-dies in old processes, and this is particularly the case when this head-section $w'$ is made so long as to provide a sufficient mass of stock to form a large head. It is this crippling of the stock in the head-section that I effectually prevent by placing the nail-blank in the heading-dies with the shoulders $w^4$ resting against the opposite and regular sloping sides of the socket, as shown in Fig. 37 of the drawings, the blank standing erect in the die, and in this position striking it with a cupped die, $D^2$, the form of the cup or recess in this die $D^2$ being governed by the size of stock from which the head is to be formed. The result of the operation of the cupped die upon the nail-blank, as described, is to swell the head-section at about its central portion, $w^5$, as shown in Fig. 38, and thus form a brace against bending or crippling at this part, if it is desirable to finish the head by striking the blank a further blow endwise with a flat or other die while it is held in the lower die, $D'$.

The function of the shoulders $w^4$ on the nail-blank is to support it in the socket $u$ in the die $D'$ by the contact of the outer edge of such shoulders with the sloping sides $u'$ of the socket, the effect being that when the head-section of the blank is compressed lengthwise by a blow or pressure in the dies, the blank will not be pushed far enough into the socket to cause it to jam, the angular shape of the shoulders at the parts in contact with the sides of the socket providing sufficient resistance to inward movement of the blank to cause the head-section to be compressed lengthwise, and yet leave the blank so loosely held in the die that it may be readily pushed out when required. If it were not for the resistance to inward motion thus offered by this peculiar construction of the relative parts of the socket in the die and the blank, the latter would be pushed so far through the die as to prevent or greatly obstruct its removal, except with extreme difficulty, from any heading-socket in a solid die of the kind denoted by the letter $D'$.

The head of the nail $v$ may be finished while the blank is still held in the socket $u$, by means of a flat die, that causes the head-section to fill out into the socket and conform substantially in shape with it. This final forming of the head causes the blank, that until this time has stood substantially erect in the socket, to tip over toward the side $u^2$ in the socket and the shank to project at an angle with the lower face of the die. This makes one side of the head conform substantially to the plane of the back of the nail, while the opposite side stands at the proper slope to the front of the nail, the top of the head sloping downward slightly from the plane of the back of the nail, or beveled. The degree of this latter slope or bevel of course depends upon the relative thickness of the head, and in the case of the nail of the type shown at $v$ will be very slight. The nail, after the head is thus finished, is easily pushed out from the sockets in the die.

In making a nail, $v'$, with a proportionally large head, the blank, which is usually cut from a wire or rod of stock that is rectangular in cross-section, as in the other case, is used. After forming a shank, $v^2$, by any ordinary and convenient process, the blank is pressed in a die, $D^3$, the socket in which is proportionately larger than the socket used in making the nail $v$ in about the ratio by which the head of the nail $v'$ exceeds the head of the nail $v$. The head-section $v^3$ of this blank is subjected to the action of the cupped die and the socketed die to produce the peculiar swell $v^4$ (see Fig. 41)—a result precisely the same as that produced in the operation already described with relation to the head of the nail $v$, the shoulders $v^5$ on the blank having precisely the same function as in the case of the other nail.

The nail-head may be subjected to the operation of a number of dies having cups or recesses of various shapes prior to the final blow with a flat die, $D^4$, the blank remaining meanwhile in the socket in the die $D^3$. The effect of the final blow tips the nail-blank to one side, as in the case already described, so that the shank projects at an angle from the lower side of the die, as shown in Fig. 44, the bevel or angular slope of the upper side of the die with relation to the back of the nail being in the case of the head of the nail $v'$, as shown in Fig. 30, quite considerable.

When it is desired to make a nail of the shape composed of frustums of pyramids joined at their bases, of the type shown in Fig. 31, the blank is of course subjected to the action of a flat finishing-die, but the head is left in one of the intermediate stages, substantially in the condition shown in Fig. 43 of the drawings. The relative area in cross-section of the nail-blank and the finished nail-head is shown in one instance in Figs. 32 and 33, and in the other in Figs. 45 and 46.

In order to form a comparatively large head, it was formerly necessary to use a nail-stock of an area in cross-section almost equal to that of the head in its largest part and to draw the nail-shank down from this large stock. This was impossible, unless the stock was heated, and a process that involves this heating of the blanks is objectionable, for reasons bearing not only on the time taken on the large number of steps in the process, but also on the quality of the finished article—points unfavorable to this process as compared with my process in which the stock has no preliminary heating. By means of my improvement in the method of making the heads, stock of proper size to be drawn down into a shank without unfavorably affecting the tenacity and cohesion of the fibers of the metal may be used, and although this requires a relatively long head-section to be left, yet such a head-section is by my process and devices thoroughly and exactly compressed, while unheated, to the desired shape and size, gaining in such process extreme compactness, density, and wearing qualities.

Instead of making use of the peculiar resisting-shoulders on the blank, a sectional die, D, divided in a plane lengthwise of the head, may be used, the plane of the section passing through the socket. This sectional form of heading-die is shown in use in the machine in the detail view, Fig. 20, where one section of the die is backed up by the substance of the die-plate and the opposite die part or section is pushed radially outward by means of the sliding wedge, so as to complete the die and the head-forming socket. This movable part of the die is held in the plate or the die-block by splines taking into grooves in the edges of the block. The wedge moves in and out in its socket in the plate in a plane at substantially right angles to the face of the die, and it is moved in to close the die parts by the spring-actuated plunger $d^{13}$, that is pushed forward by the heading-slide, and, just before the flat-face die $d^{10}$ strikes the head of the nail-blank, comes into contact with the wedge, and forces and holds it in and the die parts together. The wedge is pushed out to allow the die parts to separate, to release the nail, by a beveled surface on the end of the die striking a fixed cam, $d^{14}$, that is secured to the bed of the machine and in the path of the wedge as it revolves with the die-plate.

The solid form of heading-die D' is shown in place in the die-plate in Figs. 15 and 16, the die being held in place by dowel-pins or screws projecting into sockets in the plate, and also by means of the turn-buttons $D^5$, that are oval in form, and are held to the plate by screws passing through a slot in the center of the button, the opposite ends of which overlie the flanged edge of the die held between each two buttons.

In this form of my invention provision is for the first time made, in a machine embodying a rotary heading-plate, for the holding of a complete socketed heading-die in the plate, and a material advantage results from this construction in simplicity of parts, great ease of renewal of worn parts, and superior work as regards the nail due to solidity and rigidity of the die, and this is made possible by reason of my improvement, already described, that allows a nail after heading to be easily removed from the die. Provision is also made in my machine for using a sectional heading-die, D, in the die-plate, the several parts of such sectional die being surrounded on all sides by the substance of the plate, the ends only being practically flush with the opposite faces of the plate. The parts of the die, the line of division between which passes through the heading-socket, are closed together by the movement of the sliding wedge by the means already described, and clearly shown in the drawings in Fig. 20.

The advantage of this construction—the location of the blank-holding die, closely held and surrounded on the sides by the substance of the heading-die plate—is that the pressure upon the die parts in swaging the head of the nail to shape is borne by the substance of the heading-plate, whereas in prior machines of this class, in which a rotary heading-plate is used, one part only of a sectional die has been borne by the plate in mortises in the periphery of the plate, while another section of the die has been borne on the bed of the machine. In the operation of this prior die the lateral thrust upon the die parts is brought upon the shaft on which the heading-plate is borne, and tends to bend the shaft and throw the plate out of alignment, and thus interfere with the correct registering of the blanks with the several tools to the action of which they are subjected in the pauses in the intermittent motion of the plate.

The function of the quarter-turn plate being to change the direction of motion of the blank, as stated, it may perhaps be more properly called a "switch-plate," and it has in the independent crosswise channels an improvement over prior devices used in like machines, in that it reduces the possibility of any clogging of the blanks in the channels; and it also prevents the contact of one blank with another, and so increases the speed with which the nails may be made. When the blank drops into either of the channels $m$ or $m'$, it passes to the opposite end and strikes a guard-plate, (shown in Fig. 14 of the drawings,) and is thus held, as the switch-plate turns, in proper position to receive the thrust of the end of the drive-in rod that enters through an opening in the guard that forms a guide for the inner end of said rod.

I claim as my invention—

1. In a machine of the class described, the feed-rolls, roller-dies, the cut-off device located between them, with mechanism for operating the same, and devices for stopping the machine, combined with the slide $l^2$, located in or near the path of movement of the nail-blank, and means, substantially as described, connecting said slide with the devices for stopping the machine, as and for the purpose set forth.

2. In a machine of the class described, the rotary switch-plate arranged to receive the nail-blanks from the guideway and having a plural number of independent crosswise channels, combined with the mechanism for turning the switch-plate with an intermittent movement, all substantially as described.

3. The rotary heading-plate and devices for giving it an intermittent rotation, each step being an aliquot part of a circle, said devices consisting of a crank-arm on the heading-plate shaft bearing a spring-pawl, a ratchet-wheel and a detent-wheel fast to said shaft, detent-levers whereby said shaft is firmly held between its rotary movements, the telescoping pitman connecting the crank-arm and the driving mechanism, and the hooked arm whereby the pitman is extended, in combination with the within-described beveling, pointing, and heading dies arranged at intervals in the path of the nail-blanks held in the die-plate, all substantially as described.

4. The die-plate having an intermittent rotation and bearing a plural number of dies, each having a nail-holding and head-forming socket adapted to carry the nail-blank with its ends protruding from the plate, in combination with the beveling-dies, the trimming-dies with the scrap-clearer, the reciprocating complementary heading-die, and the push-out device and its described operating mechanism, all substantially as described.

5. In a machine for making horseshoe-nails, the rotary cam $p$, fast to a shaft of the operating mechanism, the beveling-lever $p'$, with the knuckle $p^2$, the spring-retracted plunger $p^3$, bearing on its outer end one of the beveling-dies P, and the opposing base supporting the complementary die P', with the annular bevel, in combination with the rotary die-plate adapted to carry the nail-blanks with the ends protruding, and in the pauses between its movements present the nail-blank to the operation of the said beveling-dies, all substantially as described.

6. In a device for beveling the ends of horseshoe-nails, the beveling-dies consisting of a flat-faced die having a rotary adjustment on the plunger, and a complementary die having an annularly-beveled and countersunk surface and having a rotary adjustment on the base, all substantially as described.

7. In a machine of the within-described class, the heading-plate having an intermittent rotation and bearing dies adapted to present the ends of the nail-blanks to the trimming dies, the point-trimming dies with the sliding scrap-clearing device, and the trimmer-slide and its described operating mechanism, all substantially as described.

8. In a machine of the within-described class, the butt-piece $d^{12}$ and a reciprocating heading-die, $d^{10}$, combined with the die-plate $o$, having an intermittent rotation and bearing a sectional heading-die, D, with all its sections backed up against lateral movement by the substance of the plate, and also having a die-socket opening through the die to front and rear of the plate, all substantially as described.

9. In combination with the die-plate $o$, havan intermittent rotation and bearing a plural number of sectional heading-dies, D, the sliding wedge with beveled and projecting end, the complementary heading-die $d^{10}$, the spring-seated plunger $d^{13}$, the butt-piece, and the wedge-operating cam $d^{14}$, all substantially as described.

10. In a machine of the within-described class, the wire-straightening lever bearing the guide-rolls, the feed-rolls borne in the machine, and the swinging lever of the stop device held in contact with the wire of stock as it is fed into the machine, and adapted to swing across its path and stop the machine when the end of the wire is reached, all substantially as described.

11. In combination with the feed-rolls of the within-described machine, the spring-seated bearing-blocks, and the roll-separating device consisting of a wedge with its points located between the rolls and connected to a lever pivoted to the frame of the machine, all substantially as described.

12. In combination with the feed-rolls of the within-described machine, the rod-straightening lever bearing the guide-rolls on opposite sides of the path of the rod as it is fed into the machine, and the removable clamp device whereby the said lever is clamped in position for use, all substantially as described.

13. In combination with the feed-rolls of the nail-machine, the adjustable gage $l$, located in the path of the nail-rod, the cutters for severing a nail-blank from the rod, the cut-off lever, the wiper that operates the cut-off lever, the cut-off-lever latch, and the stop device, all substantially as described.

14. In combination with the cut-off device having a reciprocating live cutter, the slide-block $l^2$ in the path of the cutter, the connecting-rod $l^3$, the stop-finger $l^4$, and the rotary rod L of the stop mechanism, all substantially as described.

15. The combination of the guideway leading from pair to pair of roller-dies and formed between blocks, the outer one of which is removable, the spring-repressed stop-lever K, having one end in contact with the removable block $K^2$ and the other in contact with the stop-finger, fast to the rotary stop-rod L and the stop-finger, all substantially as described.

16. In combination with the removable block $K^2$, on the inner side of which a portion of the nail-guideway is formed, the stop-lever composed of the lever part $k$, overlapping the lever part $k^3$, and bearing a turn-button with its edge adapted to engage the outer edge of the lever part $k^3$, the spring $k^5$, and the stop-finger fast to the stop-rod L, all substantially as described.

17. In combination with the removable outer block, $K^2$, of the guideway, the spring-repressed lever $k$, and the indicator J, automatically displayed by the movement of the lever $k$ when the nail-blanks become clogged in the guideway, all substantially as described.

GEORGE JOSEPH CAPEWELL.

Witnesses:
CHAS. L. BURDETT,
WM. E. SIMONDS.